May 18, 1954 J. F. CHITTUM 2,678,911
EMULSION TESTING
Filed Oct. 25, 1950 3 Sheets-Sheet 1
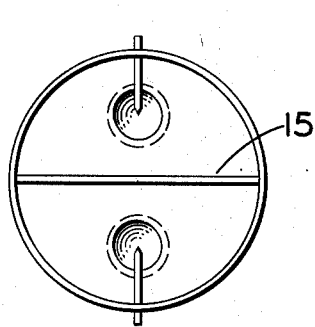
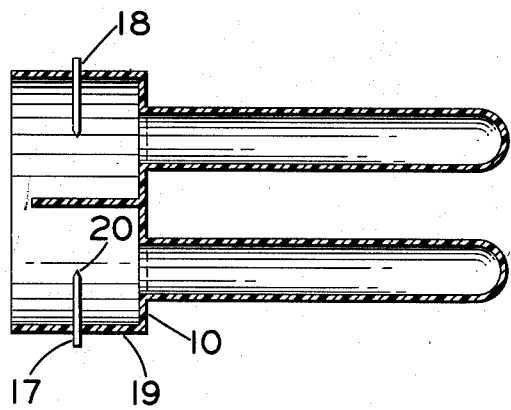
FIG. 3  FIG. 2
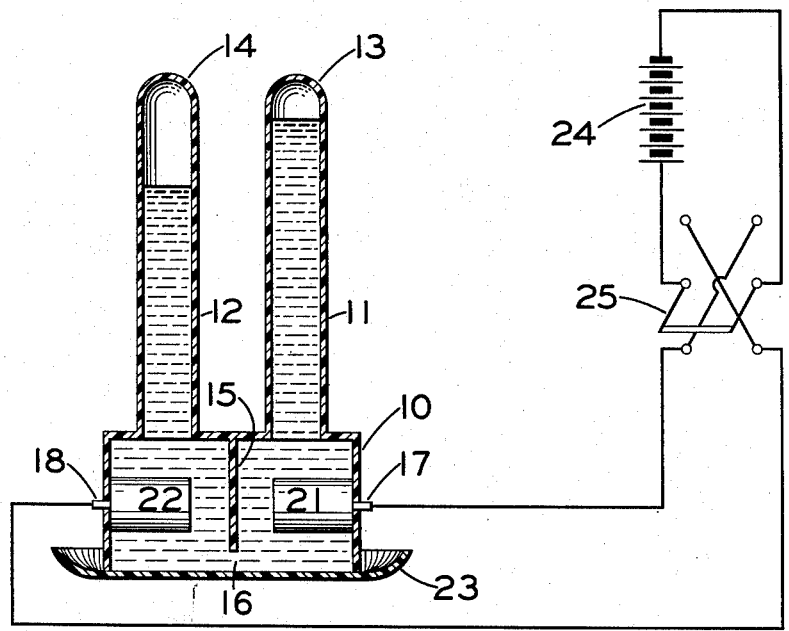
FIG. 1
INVENTOR
Joseph F. Chittum
BY Walter G. Miller
Ralph L. Freeland, Jr.
ATTORNEYS

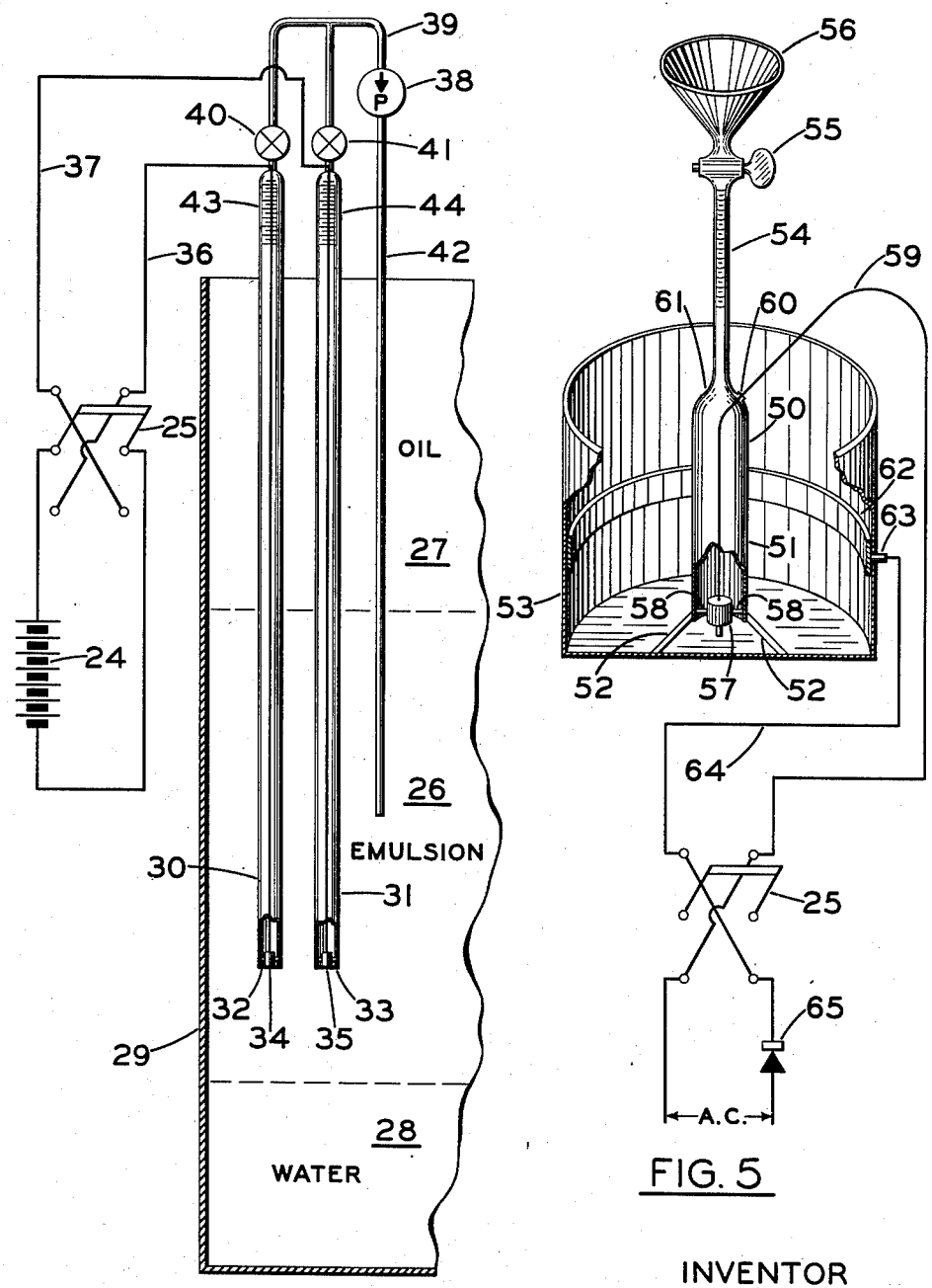

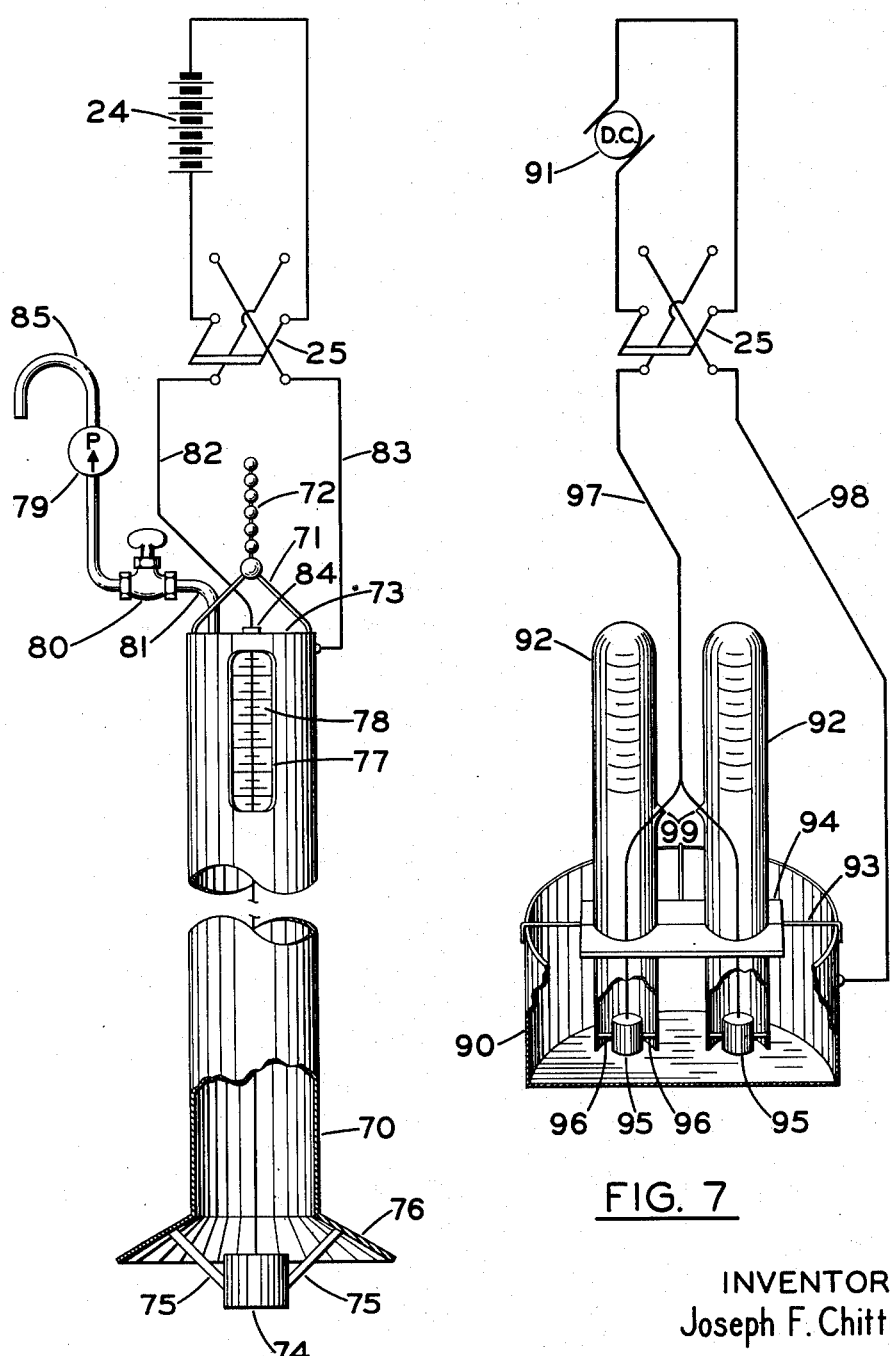

Patented May 18, 1954

2,678,911

UNITED STATES PATENT OFFICE 2,678,911

EMULSION TESTING

Joseph F. Chittum, Whittier, Calif., assignor to California Research Corporation, San Francisco, Calif., a corporation of Delaware Application October 25, 1950, Serial No. 192,015

6 Claims. (Cl. 204—185)

The present invention relates to a method of testing emulsions and more particularly relates to the testing of emulsions wherein water appears as the dispersed phase.

Heretofore, many hundreds of chemical reagents have been developed for the breaking of emulsions of the water-in-oil type. This has been due to prior theories of water-in-oil emulsions which have postulated that there are many hundreds of different types of water-in-oil emulsions of varying types and characteristics, each requiring a different chemical reagent. As distinguished from these prior theories of water-in-oil emulsions, I have found that stable emulsions in which water is the dispersed constituent are in general of only two types. These are classifiable as either positive or negative depending upon whether the electrical charge on the surface of the dispersed droplets is positive or negative, while the opposite charge is in the continuous phase. In this type of emulsion, water is the dispersed phase and oil is the continuous phase in the emulsions being tested, and I have found that an electrical double layer is established in the oil side of the interface. This is accomplished by the accumulation of oil-soluble or dispersable ions near the boundary between the phases with the occurrence of associated ions of opposite charge on the boundary itself.

Accordingly, I have found that in order either to break an emulsion or to form an emulsion of this type, the nature, or sign, of the electrical charge on the water phase determines the steps to be taken in either balancing or unbalancing the ionic charge surrounding the dispersed particles. By so determining the charge on the water phase, the selection of chemical reagents which may be most useful in forming an emulsion, or those which may best be used in breaking an emulsion, can be more easily predicted than has been possible heretofore.

It is therefore an object of the present invention to provide a method of testing the electrical polarity of the dispersed aqueous phase of a water-in-oil type emulsion by applying a directionalized potential between a pair of electrodes, at least one of which is capable of releasing gas when contacted by water to determine the ionic charge on the dispersed phase.

It is a further object of the invention to provide a method for rapidly and accurately determining the sign of the electrical charge on the water phase of an emulsion by measurement of the rate of hydrogen evolution from a water-reactive metal electrode to which a polarized current is applied to determine the chemical reagents to employ either in forming or breaking such an emulsion.

Still further objects and advantages of the present invention will become apparent from the following detailed description taken in conjunction with the appended drawings which form an integral part of the specification.

Broadly, the invention relates to a method of determining the electrical polarity of the water or aqueous phase of an emulsion of the water-in-oil type which comprises the steps of contacting the emulsion with a pair of electrodes at least one of which is characterized by its ability to liberate gas when in contact with the water constituting the aqueous phase, then applying a voltage between said pair of electrodes and measuring the rate of evolution of gas from said electrodes.

In the drawings:

Fig. 1 is a schematic representation of a preferred embodiment of apparatus which may be used in carrying out the method of the present invention.

Fig. 2 is a cross-sectional view of the emulsion testing apparatus shown in Fig. 1.

Fig. 3 is a bottom view of the apparatus shown in Figs. 1 and 2.

Fig. 4 is a schematic representation of an alternative form of apparatus for carrying out the method of the present invention by which the emulsion may be tested in situ.

Fig. 5 is a schematic representation of still a further form of apparatus which may be used in testing the electrical polarity of the aqueous phase of an emulsion of the water-in-oil type.

Fig. 6 is a schematic representation of an alternative form of apparatus similar to that shown in Fig. 4 useful in the present method of testing emulsions.

Fig. 7 is a schematic representation of a further embodiment of apparatus useful in carrying out the method of the present invention for testing the electrical charge on the aqueous phase of a water-in-oil emulsion.

Referring now to the drawings, and in particular to Fig. 1 wherein the preferred embodiment of apparatus for carrying out the method of the present invention is shown, it will be noted that a chamber or body 10, which may be of a generally cylindrical form, is provided with a pair of upwardly extending cylindrical chambers or tubes 11 and 12. The uper ends 13 and 14, of tubes 11 and 12, respectively, are preferably sealed over, while the opposite or lower ends of tubes 11 and 12 are open to chamber 10. As best seen in Fig. 3, a dividing member or partition wall 15 is so positioned in chamber 10 that the path between the open ends of tubes 11 and 12 is through the open space 16 between partition 15 and the plane of the base of chamber 10. As shown in Fig. 2, a pair of electrical contact pins 17 and 18 are arranged to pass through the wall 19 of chamber 10. Pins 17 and 18 are preferably provided with a pin-like end 20 which is capable of impaling an electrode of relatively soft metal such as alkali metals, alkaline earth metals or amalgams or alloys of such metals. As shown in Fig. 1, such metals may thus be positioned on contact pins 17 and 18 to provide a pair of metallic electrodes 21 and 22.

In the assembly of the equipment described hereinbefore, for the purpose of testing an emulsion for the electrical polarity of the dispersed aqueous phase, the chamber 10 is inverted so that tubes 11 and 12, as well as chamber 10, may be filled with the emulsion to be tested. Chamber 10 is preferably completely filled and a watch glass, or base member, 23 positioned to retain the emulsion within the test apparatus. The entire assembly of base member 23 and chamber 10 with metallic electrodes 21 and 22 positioned as shown is then inverted to the position shown in Fig. 1. Under this condition, it will be apparent that electrodes 21 and 22, which may be selected from the materials enumerated above, for example sodium, are free to react with the water in the emulsion to liberate hydrogen gas from the water of the emulsion. This reaction occurs as fast as water droplets diffuse to the reactive metal surface. Such gas will of course rise, respectively, from electrodes 21 and 22 into tubes 11 and 12 and collect adjacent the closed ends 13 and 14 of the tubes. However, as in the present arrangement, where the electrodes are of substantially the same size and material, the rate of evolution of gas will be substantially the same in both tubes.

I have found that by the application of a directionalized or polarized electrical voltage between electrodes 21 and 22, for example, by means of a battery 24 which may be connected through a switch 25 to electrical contact pins 17 and 18, that it is possible to obtain a difference in the rate of evolution of gas from electrodes 21 and 22, depending upon the direction of the voltage applied from battery 24. This is because opposite charges on the emulsion droplets and one metal electrode will result in attraction and consequent increased reaction at one of the electrodes. Like charges on the water droplets and the other metal electrode will result in repulsion and consequent decreased reaction between that electrode and the water droplets.

For the purpose of reversing the polarity of voltage between electrodes 21 and 22, switch 25 is preferably of the double-pole, double-throw type. As seen in Fig. 1, the rate of evolution of gas due to the reaction of the metal of the electrode 22 and the water droplets of the emulsion has been greater than the rate due to reaction of electrode 21 and the water droplets. This is evidenced by the fact that a greater amount of gas collected in tube 12 than in tube 11. Since the polarity of the applied voltage from battery 24 is known by the connection through switch 25, the charge on the suspended or dispersed aqueous particles in the emulsion under test may be readily determined. If on the other hand electrode 22 had been connected to the opposite side of battery 24, it will be apparent that the charge on the water droplets was of the reverse sign. Accordingly, it is apparent that the purpose of the reversing switch 25 is to provide a positive check of the ionic charge on the dispersed particles by permitting a reversal of the electrical potential between electrodes 21 and 22. By operation of reversing switch 25, it will be appreciated that the rate of evolution of hydrogen gas under the same conditions enumerated above would increase in tube 11, while the rate of evolution from electrode 22 into tube 12 would decrease. In this way, it is possible to obtain a confirmation of the results of the previous test.

Referring now to Fig. 4 in which there is shown an alternative embodiment of apparatus which may be employed in carrying out the method of the present invention, it will be noted that this apparatus provides means for testing an emulsion such as that produced from an oil well, to determine the electrical charge on the dispersed phase without removing a sample of the emulsion from the usual storage tank. As diagrammatically illustrated, the emulsion 26 may be due to the inter-mixing of an overlying oil 27 and the underlying water 28 in a tank 29. In order to test emulsion 26 in situ in tank 29, a pair of elongated tubes 30 and 31, preferably constructed of glass, quartz or plastic, are adapted to be lowered into tank 29 so that the lower ends 32 and 33 are open to emulsion 26. Within the lower ends of tubes 30 and 31, the alkaline earth metal, alkali metals as well as amalgams and alloys of these metals, may be employed as electrodes 34 and 35. Electrodes 34 and 35 may be connected to a source of D. C. potential, such as battery 24 described in the previous embodiment, through double-pole, double-throw switch 25 and lines 36 and 37, which respectively are connected to electrodes 34 and 35. The operation of the electrodes 34 and 35 within tubes 30 and 31 is very similar to that described in connection with the previous embodiment. However, in order to fill tubes 30 and 31 with emulsion 26, a pump 38 is connected to an intake line 39 connected in common to the tops of tubes 30 and 31 through valves 40 and 41, respectively. In order to prevent the inter-mixing of excess emulsion drawn up through tubes 30 and 31 with the overlying oil 27, a return line 42 may be provided between pump 38 and emulsion strata 26.

The operation of the embodiment just described includes the steps of pumping emulsion 26 into tubes 30 and 31 so that they are substantially filled. This may be accomplished by the opening of valves 40 and 41 and driving pump 38 by any conventional means until the emulsion is returned through line 42 to the strata of emulsion in tank 29. Then, valves 40 and 41 may be closed and with the D. C. potential applied from battery 24, the rate of evolution of gas may be measured in the graduated portions 43 and 44 of tubes 30 and 31. The applied voltage through emulsion 26 will of course be between electrodes 34 and 35. For purposes of checking the results of this test obtained with battery 24 connected to electrodes 34 and 35, the direction of the applied voltage may be reversed by double-pole, double-throw switch 25 for the purpose described in connection with the operation of the embodiment shown in Fig. 1.

Referring now to the apparatus shown in Fig. 5 which may be used in the practice of the method of the present invention, I have provided an elongated chamber, or tube, 50 preferably formed of glass having an enlarged cylindrical portion 51 which is mounted upon a plurality of legs 52 so that the tube 50 may be supported by the base of an emulsion testing vessel 53, which is preferably made of an electrically non-conducting material. Tube 50 is provided with an elongated, reduced portion 54 having a graduated scale adjacent the upper end of portion 54. For the purpose of filling tube 50 prior to the testing of the emulsion, an integral stop-cock arrangement 55 and a funnel 56 are arranged above portion 54. It will be apparent that the emulsion to be tested may be poured into funnel 56 and the stop-cock 55 turned to an open position to permit the tube 50 to be completely filled with the emulsion under test. A gas-generating electrode 57, selected from the group of metals capable of generating gas in the presence of water, is preferably positioned adjacent the lower end of enlarged portion 51 by any suitable means, such as a pair of support pins 58. Electrode 57 is connected to a current source by means of line 59 which is arranged to pass through a sealed, lead-in portion 60 in tapered portion 61 between the upper and lower portions of tube 50. In order to provide the opposite electrode to establish a potential across the emulsion in vessel 53, a band, or circular ring 62 of any conductive metal is preferably positioned adjacent the inner, side wall of vessel 53 and connected through a contact pin 63 to electrical line 64. Conductor lines 59 and 64 are then connected through switch 25 to a pulsating D. C. source provided by a half-wave rectifier 65 connected to an A. C. supply line.

In the operation of the apparatus shown in Fig. 5, it will be apparent that the vessel 53 is filled with the emulsion to be tested to a sufficient depth so that band electrode 62 is in contacting relationship to the emulsion and tube 50 completely filled with the emulsion under test through funnel 56 and stop-cock 55. As described above, the lower portion 51 of tube 50 is positioned above the base of vessel 53 by means of supports 52 so that a free electrical path may be provided between the gas generating electrode 57 and ring electrode 62. While in the present embodiment it will be apparent that gas evolved from the emulsion is collected only from above electrode 57, it has been found desirable to provide a reversing electrode by a reversing switch such as switch 25 to slow down intermittently the reaction of electrode 57 with the water in the emulsion. This may be found particularly desirable where the water droplets comprise a higher percentage of the emulsion and electrode 57 is a particularly active metal, such as potassium or sodium.

In Fig. 6 there is shown a further alternative arrangement for testing the electrical charge on the dispersed particles in an emulsion which may be utilized in a location such as that contemplated for the apparatus shown in Fig. 4, i. e., emulsion in situ. However, in the present embodiment the gas-collecting cylinder or chamber designated generally as 70 is preferably constructed of a conducting material such as copper, brass or bronze, and is adapted to be lowered into a tank containing the emulsion to be tested by means of a bail 71 and chain 72 which are connected to the closed and 73 of cylinder, or tube, 70. In this arrangement a gas evolving electrode 74 is positioned below the inner end of tube 70 by a pair of insulating pins 75 which are in turn attached to a flare, or skirt, portion 76 attached to the lower end of tube 70. The purpose of flare 76 is to prevent the escape of gas bubbles except into tube 70 during the testing of the emulsion. Since tube 70 is constructed of a conducting metal, a sight glass arrangement is provided by means of an elongated slot 77 cut in the opposite walls of tube 70. Preferably this slot comprises a pair of openings positioned 180° apart in the circumference of the cylindrical tube 70, so that light may pass directly through the opposed openings 77. In order to maintain the tube 70 closed to the atmosphere, the slots 77 are provided with glass windows 78 having graduate marks thereon to permit the observation of the rate of gas evolution from electrode 74. For a purpose similar to that in the apparatus shown in Fig. 4, I have provided a pump 79 and a valve 80 in a draw-up line 81. By this arrangement pump 79 is adapted to draw emulsion into tube 70 and completely fill the tube when valve 80 is open. Then, valve 80 may be closed and the rate of evolution of gas from electrode 74 measured by observing the downward movement of the emulsion level as indicated through slots 77 and windows 78 in tube 70. In the present embodiment the electrical circuit is provided by battery 24, reversing switch 25 and lines 82 and 83 which are respectively connected to electrode 74 and the wall of tube 70. As mentioned above, the wall of tube 70 in this arrangement is formed of an electrically conducting material so that line 83 may be directly attached to the tubing adjacent upper end 73. It will of course be apparent that line 82 may either be insulated or passed through an insulating bushing 84 in end wall 73 and then downwardly through the center of tube 70 to make electrical contact with electrode 74. As distinguished from the arrangement in Fig. 4, any excess emulsion drawn through line 81 may be collected from outlet line 85 and suitably disposed of.

Referring now to the apparatus shown in Fig. 7, a metallic testing vessel 90, which is adapted to be directly connected to a source of D. C. supply, such as D. C. generator 91, provides one of the electrodes of the emulsion testing apparatus. Vessel 90 additionally provides a support for a pair of non-conducting tubes 92 closed at their upper ends in the same manner as tubes 11 and 12 in Fig. 1. A supporting arrangement for tube 92 is provided by four support wires 93 adapted to rest on the top of the side wall of vessel 90. Wires 93 in turn suspend a clamping platform 94 adapted to engage the outer walls of tubes 92. Tubes 92 are so positioned between the clamping means 94 that the lower ends of the tubes are supported above the base of vessel 90. For the purpose explained in regard to the foregoing embodiments, gas evolving electrodes 95 are positioned adjacent the lower ends of tubes 92 by any suitable means such as pins 96 and the electrodes 95 connected in common to a D. C. generator 91 through reversing switch 25 and lines 97 and 98. For the purpose of preventing the lead-in wire 97, which is connected into both tubes 92, from interfering with the measurement of gas evolved in the upper ends of the tubes, a lead-in bushing 99 is preferably provided in each of the side walls of tubes 92 for admitting line 97 to the interior thereof. Wire 98 is connected to the metallic side wall of vessel 90 to provide the electrically conductive circuit through the emulsion contained therein. The purpose of the present embodiment is to provide a parallel arrangement for measuring the rate of evolution of gas from the water phase of an emulsion containing water in order to permit the concurrent use of different materials in electrodes 95.

In the operation of the apparatus shown in Fig. 7, it will be apparent that the emulsion to be tested is filled into vessel 90 and the tubes 92 inverted while clamped together by clamping means 94 and then returned to the position shown in Fig. 7 so that the electrical circuit may be completed between the inner surface of vessel 90 and the gas evolving electrodes 95.

From the description of the foregoing embodiments of apparatus which may be utilized in carrying out the method of the present invention, it will be apparent that numerous changes and modifications in the apparatus may be made depending upon the conditions, locations and availability of the emulsions to be tested, without departing from the method of the present invention. Likewise, it will be apparent that the exact electrode material will be selected depending primarily on the percentage of water content of the emulsion under test. In this regard, it will be apparent that sodium and potassium are extremely satisfactory for testing water-in-oil types of emulsion where the percentage of water is extremely small, whereas in an emulsion containing a higher percentage of water the use of an analgam such as mercury and sodium, or mercury and potassium, is more desirable. Additionally, it will be apparent that the applied voltage from the steady or pulsating D. C. source will be varied in accordance with the conductivity of the emulsion. In particular, a D. C. voltage of 500 to about 750 volts has been found desirable for a rapid test of most emulsions of the water-in-oil type.

From the foregoing description of the method of the present invention, it will be apparent that a method of testing the electrical polarity of an aqueous emulsion to determine the ionic charge on the dispersed phase has been provided which may be accurately and rapidly carried out. Additionally, the present method provides a means for rapidly determining the effectiveness of chemical reagents for both breaking and forming emulsions of the water-in-oil type.

While modifications and changes in the method and apparatus described in this specification will occur to those skilled in the art, all such modifications and changes that fall within the scope of the appended claims are intended to be included thereby.

I claim:

1. A method of determining the electrical polarity of the aqueous phase of a water-in-oil type emulsion comprising the steps of contacting said emulsion with a pair of electrodes, at least one of which is characterized by its ability to liberate gas when in contact with said aqueous phase, applying a polarized voltage between said pair of electrodes and measuring the evolution of gas from the aqueous phase of said emulsion in contact with said one electrode.

2. A method of determining the electrical polarity of the water droplets dispersed as a water-in-oil emulsion comprising the steps of contacting said emulsion with a pair of electrodes at least one of which is characterized by its ability to liberate gas when in contact with said water droplets, applying a polarized voltage between said one electrode and the other electrode and measuring the evolution of gas from the water droplets which contact said one electrode.

3. A method of testing an emulsion of the water-in-oil type comprising the steps of positioning a pair of substantially similar metal electrodes in said emulsion, said electrodes being characterized by their ability to liberate hydrogen when chemically reacted with water and selected from the group consisting of alkali metals, alkaline earth metals and alloys containing said metals as an active hydrogen-liberating agent therein, applying a directionalized current between said electrodes and separately measuring the rate of evolution of hydrogen from emulsion surrounding said electrodes as an indication of the sign of the electrical charge on the water particles in said emulsion.

4. A method of determining the electrical polarity of water droplets dispersed as a water-in-oil emulsion comprising the steps of contacting said emulsion with a pair of electrodes selected from the group consisting of alkali metals, alkaline earth metals, and alloys of alkali and alkaline earth metals, passing a direct current between said electrodes and measuring the rate of gas evolution from said emulsion around each of said electrodes as an indication of the polarity of said water droplets.

5. A method in accordance with claim 4 in which said electrodes are sodium.

6. A method in accordance with claim 4 in which said electrodes are potassium.

References Cited in the file of this patent

UNITED STATES PATENTS

| Number | Name | Date |
|---|---|---|
| 2,116,509 | Cottrell | May 10, 1938 |

OTHER REFERENCES

"Journal of Industrial And Engineering Chemistry," vol. 12 (1920), pages 133–135.

"Treatise On Inorganic And Theoretical Chemistry," by Mellor, vol. 1, (1922), page 135.